United States Patent [19]
Gandy

[11] Patent Number: 5,159,651
[45] Date of Patent: Oct. 27, 1992

[54] ELECTRO-OPTICAL CONNECTOR ASSEMBLY

[75] Inventor: Ronald L. Gandy, Culpeper, Va.

[73] Assignee: The Rochester Corporation, Culpeper, Va.

[21] Appl. No.: 798,281

[22] Filed: Nov. 25, 1991

[51] Int. Cl.⁵ .............................................. G02B 6/38
[52] U.S. Cl. .................................... 385/56; 385/138; 385/75
[58] Field of Search ...................... 385/56, 53, 54, 75, 385/138, 139

[56] References Cited

U.S. PATENT DOCUMENTS

| | | | |
|---|---|---|---|
| 3,922,064 | 11/1975 | Clark et al. | 350/96 C |
| 4,185,886 | 1/1980 | Corrales | 350/96.21 |
| 4,190,316 | 2/1980 | Malsby | 350/96.18 |
| 4,229,876 | 10/1980 | Doty | 29/469 |
| 4,279,469 | 7/1981 | Forman | 350/96.22 |
| 4,798,433 | 1/1989 | Irvin et al. | 385/139 X |
| 4,896,939 | 1/1990 | O'Brien | 385/56 |
| 5,015,061 | 5/1991 | Giannini | 385/56 |
| 5,024,503 | 6/1991 | Gunn et al. | 385/53 |

OTHER PUBLICATIONS

Maranto, New Coupling Mechanism Design and Electro-Optical Connector for Harsh Environmental Applications, Connection Tech. Jan., 1990, p. 29.

Primary Examiner—John D. Lee
Assistant Examiner—S. W. Barns
Attorney, Agent, or Firm—Lorusso & Loud

[57] ABSTRACT

An electro-optical connection assembly comprising a receptacle assembly and a plug assembly adapted for interconnection, the receptacle assembly having a first fiber optic line and a first electrically conductive tube concentrically arranged therein, and the plug assembly having a second fiber optic line and a second electrically conductive tube concentrically arranged therein, the receptacle assembly and the plug assembly being adapted for face-to-face connection to connect the first fiber optic line to the second fiber optic line and the first electrically conductive tube to the second electrically conductive tube. The receptacle assembly is further provided with means to resist displacement of the first fiber optic line by underwater pressure on the face of the receptacle assembly.

12 Claims, 5 Drawing Sheets

5,159,651

ELECTRO-OPTICAL CONNECTOR ASSEMBLY

BACKGROUND OF THE INVENTION

1. Field of the Invention

The invention relates to connector devices and is directed more particularly to a connector assembly for interconnecting electrical and fiber optic transmission lines.

2. Discussion of the Prior Art

It is known to use electrical transmission lines for providing power and, simultaneously, fiber optic lines for the transmission of data. The two types of transmission lines have of late been combined in common connectors, such that a single connector provides contacts for both lines. Simultaneous use of electrical and optical transmission lines is common between off-shore oil rigs and shore stations and in various military underwater applications. Of particular criticality in such arrangements is the precise alignment and abutment of the fiber optic contacts which, if misaligned, suffer from severe loss of optical transmission. If the fiber optic contacts abut too lightly, there will be substantial loss of optical transmission. If the fiber optic contacts abut too heavily, the contacts can become scratched and/or misshapen, again causing diminution of transmission.

Thus, it is important that the optical contacts engage in precise alignment and that the abutting pressure therebetween be firm but not excessive. Further, inasmuch as such connectors are often used in underwater environments, it is important that a connector mounted on a bulkhead of an underwater vessel be able to withstand moderate underwater pressure, so that the contact components are not pushed into the connector to a position in which they can no longer make appropriate contact. In addition to the concerns relative to the optical fiber connection, it is equally important that the electrical contacts make firm and intimate connection so as to minimize loss of electrical power at the juncture.

SUMMARY OF THE INVENTION

Accordingly, an object of the present invention is to provide a connector assembly adapted to connect together electrical transmission lines and adapted to simultaneously connect together fiber optic transmission lines, with both electrical and fiber optic transmission line contacts disposed in a single connector.

Another object of the invention is to provide such a connector assembly in which means are provided for alignment of the electrical contacts with one another and, virtually simultaneously, alignment of the fiber optic contacts with one another.

Still another object of the invention is to provide such a connector in which there is provided means for mounting the fiber optic contact in at least one connector such that the contact is resiliently biased in a direction toward its free end, to ensure proper axial position relative to the optic contact of the other connector.

A still further object of the invention is to provide in a connector of the type above described, and adapted to be mounted in a bulkhead of an underwater vessel, means for holding the position of components thereof against pressure exerted by an underwater environment.

With the above and other objects in view, as will hereinafter appear, a feature of the present invention is the provision of an electro-optical connector assembly comprising a receptacle assembly and a plug assembly, the receptacle assembly and plug assembly being adapted for face-to-face interconnection with each other, the receptacle assembly comprising a receptacle housing having a first bore therethrough, a first fiber optic line extending from outside rearwardly of the receptacle housing, through the first bore, and having a first end extending forwardly from the receptacle assembly face, a non-electrically conductive sleeve disposed on the first optic line and extending beyond the first end outwardly from the receptacle assembly face, an electrically conductive receptacle contact housing disposed around the first fiber optic line and the sleeve and having a free end extending outwardly from the receptacle face substantially coextensive with the sleeve, and an electrically conductive first wire joined to the receptacle contact housing and extending outwardly and rearwardly of the receptacle housing, the plug assembly comprising a plug housing having a second bore therethrough, a second fiber optic line extending from outside rearwardly of the plug housing through the second bore, and having a second end disposed in the second bore, an electrically conductive plug contact housing disposed around the second fiber optic line within the plug housing, and an electrically conductive second wire joined to the plug contact housing and extending outwardly rearwardly from the plug housing, the receptacle assembly sleeve being adapted to slidingly receive the plug assembly second fiber optic line end to permit abutment of the first fiber optic line first end and the second fiber optic line second end in the sleeve, the plug contact housing having an enlarged portion therein around the second fiber optic line end and adapted to slidingly receive the receptacle contact housing free end to connect together the electrically conductive receptacle contact housing and the electrically conductive plug contact housing, whereby to join the electrically conductive wires and the fiber optic lines.

In accordance with a further feature of the invention, there is provided in a connection assembly, as above described, means for preventing rearward displacement of the first fiber optic line by underwater pressure on the face of the receptacle assembly. In furtherance thereof, the receptacle assembly first fiber optic line has thereon an enlarged contact base portion and the receptacle assembly includes a contact retainer member disposed in the receptacle contact housing and around the first fiber optic line, the contact retainer member comprising a rigid sleeve portion with a first end abutting the first fiber optic line enlarged contact base portion and a second end having an outwardly extending flange portion, the flange portion being anchored in the receptacle housing and fixed to a rearward end of the receptacle contact housing, whereby, underwater pressure exerted against the face of the receptacle assembly, urging the first fiber optic line rearwardly, is resisted by the contact retainer member.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
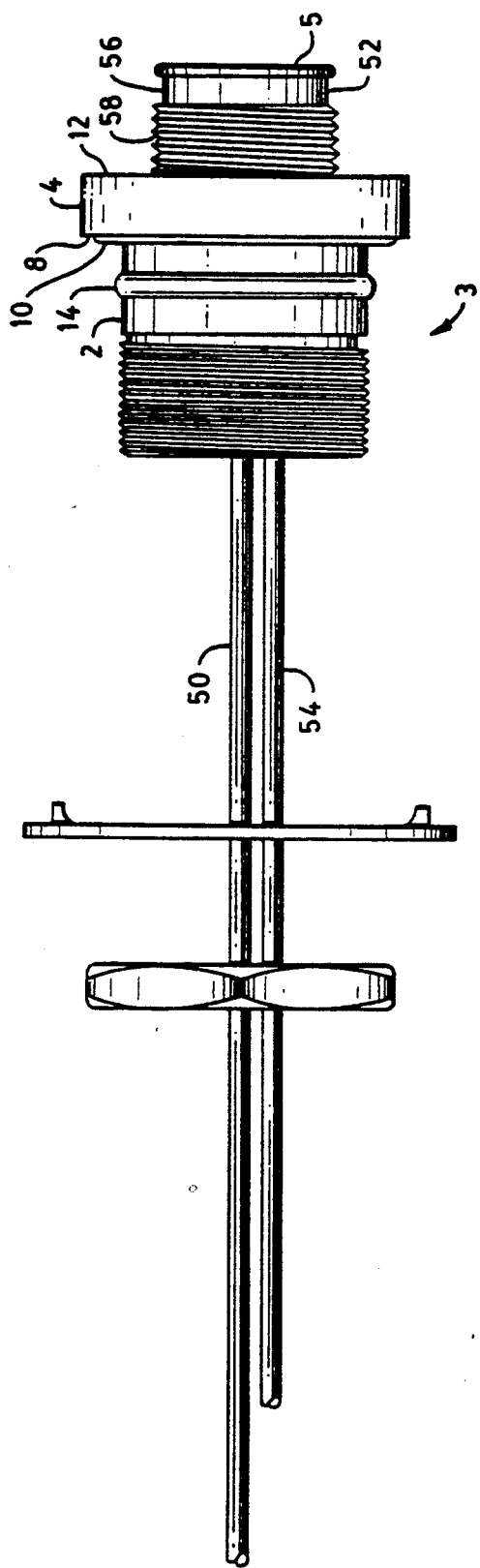
FIG. 1 is a side elevational view of a receptacle assembly portion of the connector assembly, illustrative of an embodiment of the invention.
Figure 2:
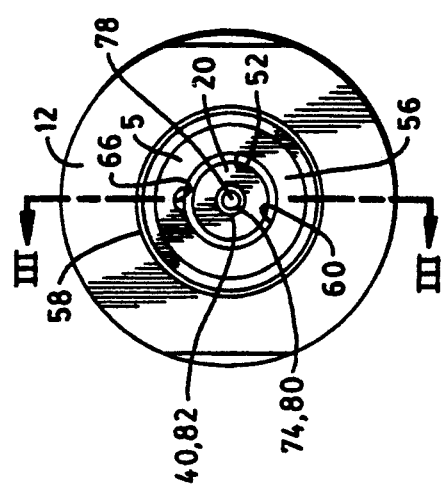
FIG. 2 is an end elevational view of the receptacle assembly shown in FIG. 1.
Figure 3:
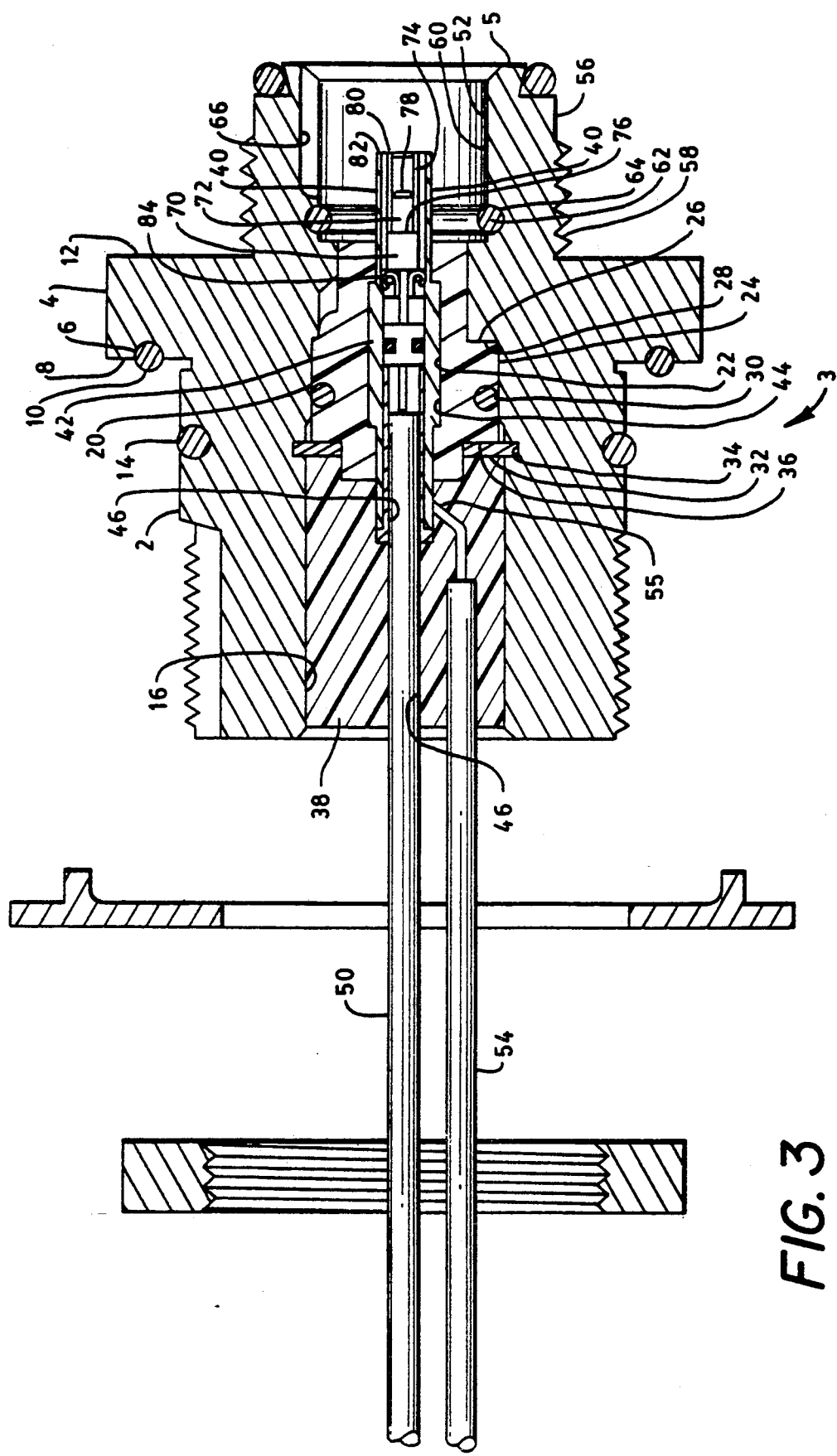
FIG. 3 is a sectional view, taken along line III—III of FIG. 2.

Referring to FIGS. 1-3, it will be seen that the illustrative receptacle assembly includes a receptacle outer housing 2, preferably of corrosion-resistant metal or rigid plastic, and adapted for mounting in a bulkhead (not shown), with a rearward portion 3 thereof disposed within a water-tight chamber and a face portion 5 thereof disposed in an underwater environment. The receptacle outer housing 2 includes a flange portion 4 having mounted in an annular groove 6 (FIG. 3) in a rearward surface 8 thereof, a seal ring 10. In a mounted disposition, the rearward surface 8 of the flange portion 4 buts an outer wall of a vessel (not shown). In underwater application, pressure on a forward surface 12 of the flange portion 4 forces the seal ring 10 into firm engagement with the bulkhead wall. The receptacle outer housing 2 may be provided with additional sealing means 14 for engagement with an internal edge of an aperture in the bulkhead wall in which the receptacle assembly is mounted.

The receptacle outer housing 2 is provided with a bore 16, (FIG. 3) therethrough. Disposed in the bore 16 is a receptacle inner housing 20, preferably of a rigid plastic material. The receptacle inner housing 20 is provided with a channel 22 therethrough and on its exterior is provided with a collar portion 24 which, at a forward face 26 thereof, abuts a rearwardly facing surface 28 of the receptacle outer housing 2. The collar portion 24 preferably is provided with sealing means 30 to insure a water tight seal between the receptacle outer and inner housings 2, 20. A washer 32 is seated in an annular groove 34 of the receptacle outer housing 2, and extends inwardly of the bore 16, and abuts a rearward surface 36 of the collar portion 24 to prevent rearward movement of the receptacle inner housing 20 relative to the receptacle outer housing 2.

Behind the receptacle inner housing 20, i.e., leftwardly of the receptacle inner housing 20, as viewed in FIG. 3, the receptacle outer housing bore 16 is filled with a potting plastic 38 which further resists rearward movement of the receptacle inner housing 20 in the receptacle outer housing bore 16.

Within the receptacle inner housing channel 22, there is disposed a receptacle contact housing 40 of electrically conductive material, such as brass. The receptacle contact housing 40 is tubular in configuration with an enlarged central portion 42 disposed in an annular recess 44 in the channel 22 in the receptacle inner housing 20. The receptacle contact housing 40 defines a bore 46 through which there extends a fiber optic transmission line 50.

The receptacle contact housing 40 extends rearwardly (leftwardly as viewed in FIG. 3) of the receptacle inner housing 20 and near its rearward end is embedded in the potting plastic 38. The receptacle contact housing 40 also extends forwardly (rightwardly as viewed in FIG. 3) of the receptacle inner housing 20 and is disposed centrally of a socket portion 52 of the receptacle outer housing 2. The bore 46 defined by the receptacle contact housing 40 extends rearwardly through the potting plastic 38 and out the rearward end of the receptacle assembly.

Joined to the receptacle contact housing 40 is an electrical transmission line 54, which extends rearwardly and outwardly from the receptacle assembly, along with the fiber optic transmission line 50. A juncture 55 (FIG. 3) of the receptacle contact housing 40 and the electrical transmission line 54 is embedded in the potting plastic 38.

The socket portion 52 of the receptacle assembly comprises essentially an annular wall 56 extending forwardly from the flange portion 4. The annular wall 56 is provided with external threads 58 and defines internally a cavity 60 with the forward end of the receptacle contact housing 40 therein and extending centrally thereof. The socket portion cavity 60 preferably is provided with sealing means 62 disposed in a recess 64 therein. The socket portion annular wall 56 is provided with an internal axial groove 66.

The fiber optic transmission line 50 is provided with an enlarged contact base portion 70, from which there extends forwardly a receptacle fiber optic contact 72. Disposed around the receptacle fiber optic contact 72 is a split sleeve 74 of a non-electrically conductive material, preferably a ceramic, which abuts a forward shoulder 76 of the contact base portion 70 and extends forwardly of a distal end 78 of the receptacle fiber optic contact 72. A free end 80 of the split sleeve 74 substantially coincides with a free end 82 of the receptacle contact housing 40. Mounted on the optic transmission line 50 rearwardly of the contact base portion 70 in a circular spring clip 84.

Figure 4:
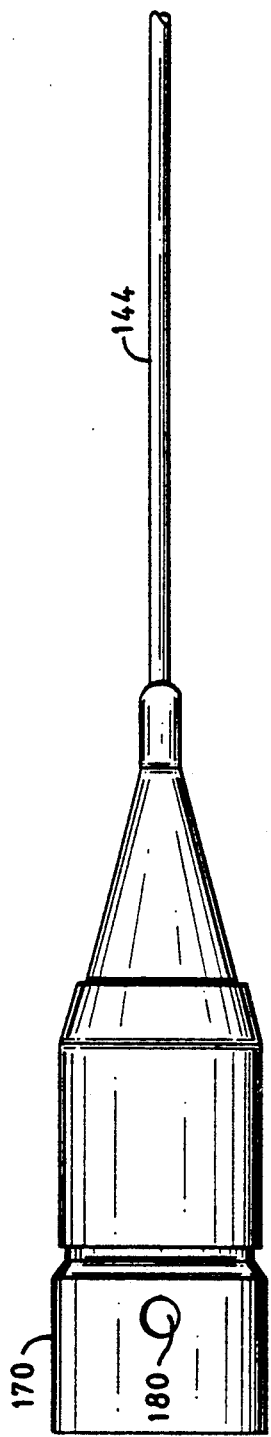
FIG. 4 is a side elevational view of a plug assembly portion of the connector assembly, illustrative of an embodiment of the invention.
Figure 5:
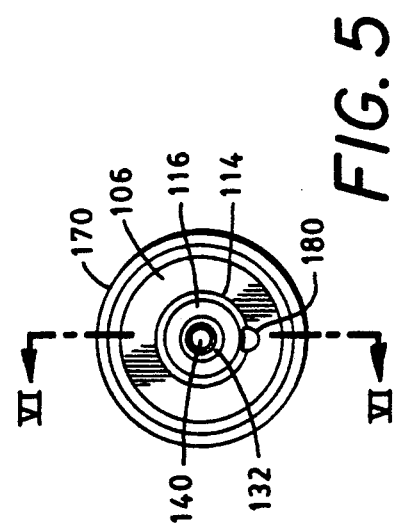
FIG. 5 is an end elevational view of the plug assembly shown in FIG. 4.
Figure 6:
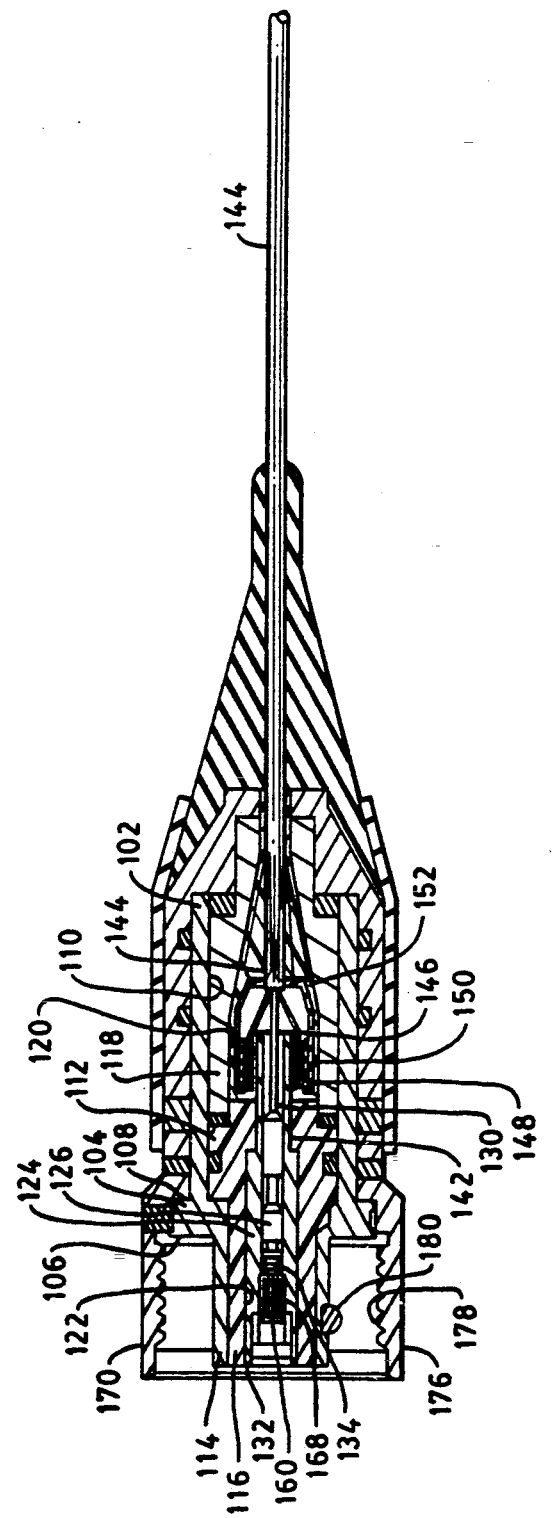
FIG. 6 is a sectional view, taken along line VI—VI of FIG. 5.

Referring to FIGS. 4-6, it will be seen that the illustrative plug assembly includes a plug outer housing 102, of a corrosion resistant metal or rigid plastic, adapted for connection face-to-face, to the above-described receptacle assembly, as will be described hereinbelow. The plug outer housing 102 is provided with an outwardly extending annular flange 104 having a forwardly (leftwardly, as viewed in FIG. 6) facing surface 106 and a rearwardly (rightwardly, as viewed in FIG. 6) facing surface 108. The plug outer housing 102 is provided with a bore 110 in which is disposed a plug inner housing 112, of a rigid, non-electrically conductive material, preferably a rigid plastic. A distal end 114 (FIG. 6) of the plug outer housing 102 and a distal end 116 of the plug inner housing 112 are substantially coterminus. In the plug outer housing 102 and rearwardly of the plug inner housing 112 is a boot member 118 having therein a chamber 120.

The plug inner housing 112 is provided centrally thereof with a channel 122 therethrough in which there is disposed a plug contact housing 124 of electrically conductive material, such as brass. The plug contact housing 124 is provided with a bore 126 therethrough in which is disposed a plug fiber optic transmission line 130.

A distal end 132 of the plug contact housing 124 is flush with the distal ends 114, 116 of the plug outer housing 102 and the plug inner housing 112, respectively, to cooperatively define a substantially planar surface including the distal ends 114, 116, 132 (FIG. 6).

A portion of the plug fiber optic transmission line 130, is configured in the form of compressible washers 134 (FIG. 7) which permit the optic line 130 to extend and shorten axially to a limited degree. Extending forwardly (leftwardly, as viewed in FIG. 7) of the compressible washer portion 134 of the optic line 130 is a plug fiber optic contact 136 which extends into an enlarged portion 138 of the plug contact housing 124. The plug fiber optic contact 136 has a distal end 140 adapted to engage the receptacle contact distal end 78.

The plug contact housing 124 includes a sleeve portion 142 extending rearwardly into the boot member chamber 120. Extending into the boot member chamber 120 from rearwardly and outwardly of the plug assembly is a cable 144 having therein the plug fiber optic transmission line 130 and an electrical power line. The electrical power line is divided into several electrical contacts 146 which are joined to the sleeve portion 142 of the electrically conductive plug contact housing 124. Distal ends of the electrical contacts 146 are covered by a collar member 148 (FIG. 7) and the collar member 148 is, in turn, covered by an isolation sleeve 150 which extends to and joins the cable 144. The boot chamber 120 is filled with potting plastic 152 which solidly anchors the cable 144 in the plug assembly. To insure that the cable cannot be pulled from the plug assembly, the cable may be provided with hook members 154 which are embedded in the potting plastic 152.

Around the plug fiber optic contact 136 and fitted in the enlarged portion 138 of the plug contact housing bore 126 is a bowed louvered band 160. Ends 162, 164 (FIG. 7) of the band 160 are in firm engagement with the interior of the plug contact housing 124. A central portion 166 of the band 160 is bowed inwardly and includes a series of louvers 168 (FIG. 6) extending inwardly of the band. The band 160 is of electrically conductive material, such as brass.

The plug assembly includes an engaging nut 170 having a cap portion 172 (FIG. 7) held between the rearwardly facing surface 108 of the annular flange 104 and a washer 174 fixed to the exterior of the plug outer housing 102. The engaging nut 170 has a cylindrically shaped wall portion 176 (FIG. 6) having therein internal threads 178 engagable with the external threads 58 on the receptacle socket portion 52.

The plug assembly outer housing 102 is further provided with a detent 180 on the exterior of the plug outer housing 102 near the distal end 114 thereof, which detent is slidably receivable by the receptacle outer housing socket portion internal axial groove 66.

Figure 7:
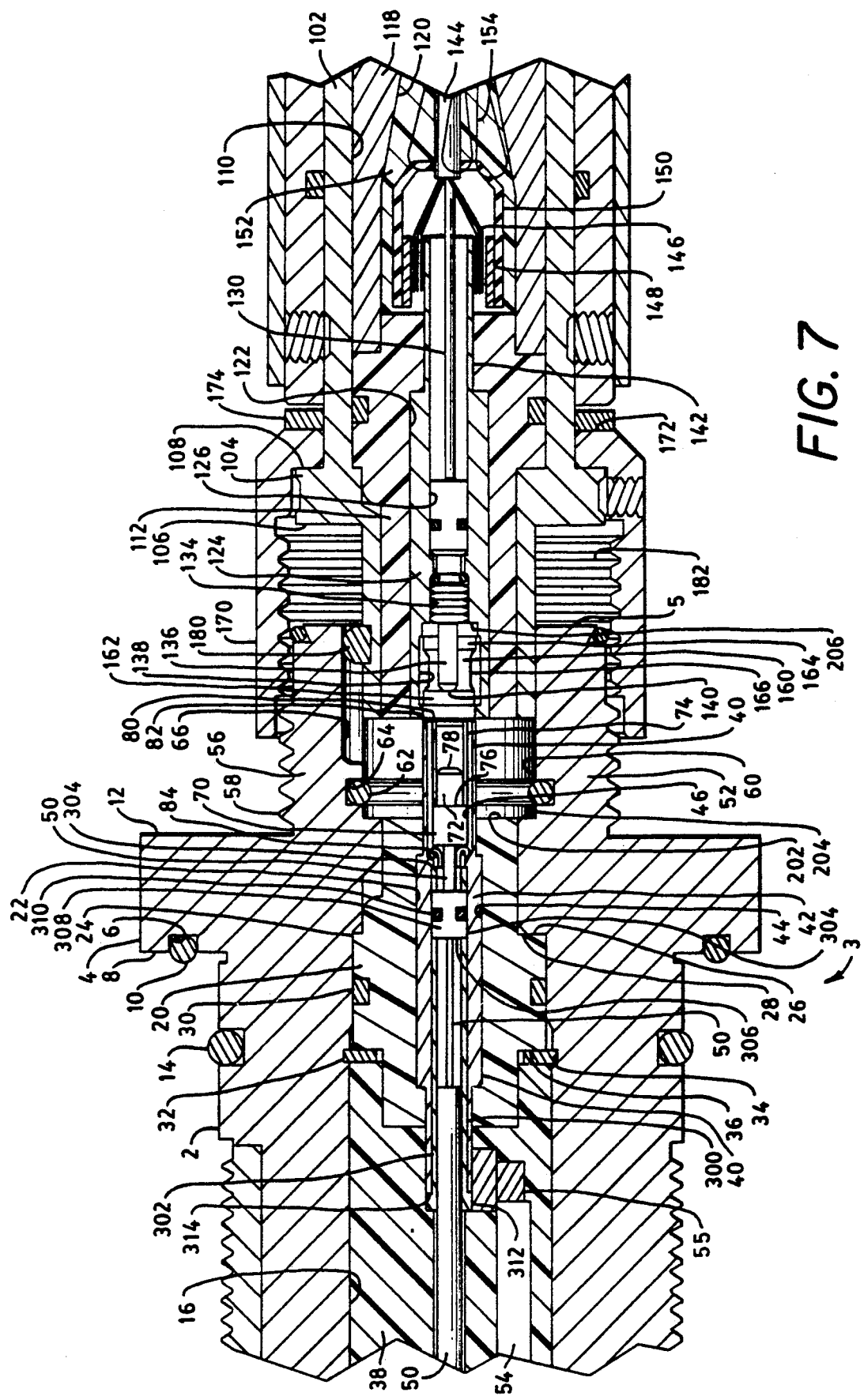
FIG. 7 is a sectional view, showing the receptacle assembly of FIG. 3 and the plug assembly of FIG. 6 being connected to one another.

Referring to FIG. 7, it will be seen that the plug assembly engaging nut 170 is adapted to screw onto the receptacle assembly socket portion 52. To enable the engaging nut 170 to be screwed fully onto the socket portion 52, it is necessary that the plug detent 180 be received in the receptacle internal axial groove 66. In bringing together the receptacle assembly and the plug assembly, the receptacle socket portion 52 threadedly enters an annular space 182 inwardly of the plug engaging nut 170. The plug outer housing 102 slidably enters the socket portion cavity 60, and therewith the plug inner housing 112 and the plug contact housing 124. The outer surface of the plug outer housing 102 engages the sealing means 62 in the socket portion internal recess 64. The receptacle contact housing 40 slidably enters the plug contact housing 124 and passes into the enlarged portion 138 of the contact housing bore 126 and into engagement with the louvered band 160. The plug fiber optic contact 136 enters the receptacle split sleeve 74, and the receptacle fiber optic contact distal end 78 engages the plug fiber optic contact distal end 140.

When the receptacle assembly and plug assembly are fully connected, the fiber optic contacts 72, 136 are engaged, as noted above. In addition, the face portion 5 of the receptacle socket portion 52 engages the plug flange 104 forwardly facing surface 106. The distal ends 114, 116, 132, respectively, of the plug outer housing 102, the plug inner housing 112 and the plug contact housing 124 engage interior surfaces 202, 204, respectively (FIG. 7), of the receptacle outer housing 2 and the receptacle inner housing 20. The receptacle contact housing free end 82 approaches and may engage a surface 206 in the interior of the plug contact housing 124. The free end 80 of the split sleeve 74 extends to a point short of engagement with the compressible washer portion 134 of the plug fiber optical line 130.

As the receptacle and plug assemblies are brought together in face-to-face fashion, firm contact is made between the electrically conductive receptacle contact housing 40 and the louvers 168 of the conductive band 160. Thus, an electrical conduit is established which includes the electrical transmission line 54 (FIG. 3), the receptacle contact housing 40, the louvered band 160 (FIG. 6), the plug contact housing 124, the electrical contacts 146 (FIG. 7) and the electrical transmission line in the cable 144, which line comprises a continuation of the contacts 146.

The louvered band permits a degree of flexibility, or latitude, with respect to positioning of the receptacle contact housing 40 relative to the louvered band 160. The bowed configuration of the band 160 guides the incoming receptacle contact housing 40 to an essentially central location in the band 160. The inwardly-reaching louvers 168 (FIG. 6) insure that contact is made at a number of locations between the band and the receptacle contact housing. Further, the elongated louvers 168 facilitate proper functioning of the electrical circuit, whether or not the free end 82 of the receptacle contact housing 40 reaches the plug interior surface 206.

Thus, the arrangement of electrical contacts serves to correct widthwise misalignment of the electrical contacts, i.e., the receptacle contact housing 40 and the band 160, and to overcome any axial positioning shortcomings introduced by a combination of manufacturing tolerances, or the like.

As the receptacle and plug assemblies are brought together, the plug fiber optic contact 136 is received by the receptacle split sleeve 74. The plug optical contact distal end 140 is rounded (FIG. 7) and therefore able to slidably seek the opening of the sleeve 74. By virtue of being split at a point throughout its length, the sleeve 74 is provided with widthwise flexibility, such that if the rounded distal end 140 of the plug fiber optic contact engages an edge of the sleeve 74, the contact end 140 will tend to slip into the sleeve 74. Further, the sleeve, being split, is adapted to expand slightly to accept a mis-aligned contact end. Still further, the circular spring clip 84 permits a degree of sidewise movement of the contact base portion 70 and the receptacle fiber optic contact 72 within the receptacle contact housing 40. Such movement of the fiber optic line 50 forward of the spring clip 84 is somewhat pivotal in nature, such that the sleeve 74 is provided with an added increment of sidewise flexibility in accepting the plug fiber optic contact 136.

Once the receptacle fiber optic contact distal end 78 and the plug fiber optic contact distal end 140 contact each other, it is important that the end to end abutment be firm, but not such as to disfigure the contacts, or cause scratching of the contacts. The compressible washer portion 134 of the plug fiber optic line 130 permits the plug fiber optic contact 136 to withdraw into the plug contact housing enlarged bore portion 138 in response to undue pressure exerted by the receptacle fiber optic contact 72, obviating possible damage to the fiber optic contacts 72, 136 by excessive abutting pressure.

The plug detent 180 in the receptacle internal axial groove 66 prevents rotation of the receptacle assembly relative to the plug assembly, which rotation could cause scratching of the abutting fiber optic contact distal ends 78, 140, with resulting loss of optical transmission.

Accordingly, the arrangement of fiber optic contacts serves to correct widthwise misalignment of the fiber optic contacts and to rectify axial positioning problems raised by inappropriate abutting pressure between such contacts.

Upon completion of the interconnection of the receptacle assembly and the plug assembly, a fiber optic transmission conduit is established which includes the receptacle fiber optic transmission line 50, the contact base portion 70, the contact 72, the contact 136, the washer portion 134, and the plug fiber optic transmission line 130 passing into and through the cable 144.

As noted above, when not in use, the receptacle socket portion 52 may be covered with a cap (not shown) which is similar to the engaging nut 170, but with a closed cap portion 172, such that screwing the cap onto the socket portion external threads 58 closes the receptacle cavity 60 to protect the components therein. In underwater environments, when the cap is removed and prior to inter-connection of the receptacle and plug assemblies, the face of the receptacle assembly is subject to water pressure, which may cause components of the receptacle to be urged rearwardly, particularly the fiber optic transmission line 50. When the cap is inadvertently left off the open receptacle assembly, the water pressure may have a lengthy period in which to bear against the receptacle fiber optic line 50 and urge displacement thereof, and/or migrate into the receptacle assembly.

In a preferred embodiment of the invention there is added to the above-described receptacle assembly, a contact retainer 300 (FIG. 7), preferably of metal, positioned within the receptacle contact housing 40. The contact retainer 300 includes a rigid sleeve portion 302 having a forward end 304 abutting a rearward surface 306 of an enlarged collar portion 308 of the receptacle fiber optic transmission line 50. The enlarged collar portion 308 of the optic line 50 is provided with o-ring sealing means 310 to thwart water migration. The rearward end of the contact retainer 300 is provided with an outwardly extending flange 312, which is soldered to the rearward end 314 of the receptacle contact housing 40. The flange 312 is disposed in the potting plastic 38. Thus, the receptacle fiber optic transmission line 50 is prevented from rearward movement in the receptacle assembly by the forward end 304 of the contact retainer sleeve portion 302, held in position by the contact retainer flange 312, anchored in the potting plastic 38 and fixed to the receptacle contact housing 40 rearward end 314.

It is to be understood that the present invention is by no means limited to the particular constructions herein disclosed and/or shown in the drawings, but also comprises any modifications or equivalents within the scope of the claims.

Having thus described my invention, what I claim as new and desire to secure by Letters Patent of the United State is:

1. An electro-optical connector assembly comprising a receptacle assembly and a plug assembly, said receptacle assembly and said plug assembly being adapted for face-to-face interconnection with each other, said receptacle assembly comprising receptacle housing means having a first bore therethrough, a receptacle fiber optic line extending from outside rearwardly of said receptacle housing means through said first bore, and having as a portion thereof a receptacle fiber optic contact extending forwardly from a face portion of said receptacle assembly, a non-electrically-conductive sleeve disposed around said receptacle fiber optic contact and extending beyond said contact outwardly from said receptacle assembly face portion, an electrically conductive receptacle contact housing disposed around said receptacle fiber optic line and said sleeve and having a free end extending outwardly from said receptacle face portion substantially coextensive with said sleeve, and an electrically conductive first wire joined to said receptacle contact housing and extending outwardly and rearwardly of said receptacle housing, said plug assembly comprising plug housing means having a second bore therethrough, a plug fiber optic line extending from outside rearwardly of said plug housing means through said second bore, and having as a portion thereof a plug fiber optic contact disposed in said second bore, and an electrically conductive plug contact housing disposed around said plug fiber optic contact within said plug housing, and an electrically conductive second wire joined to said plug contact housing and extending outwardly rearwardly from said plug housing, said receptacle assembly sleeve being adapted to slidingly receive said plug fiber optic contact to permit abutment of said receptacle fiber optic contact and said plug fiber optic contact in said sleeve, said plug contact housing having a cavity therein around said plug fiber optic contact and adapted to slidingly receive said receptacle contact housing to connect together said electrically conductive receptacle contact housing and said electrically conductive plug contact housing, whereby to join said electrically conductive wires and to join said fiber optic lines.

2. The connector assembly in accordance with claim 1 wherein said receptacle contact housing around said sleeve is further disposed around a fiber optic contact base portion of said receptacle fiber optic line and has an inside diameter greater than the outside diameter of said contact base portion and said sleeve, whereby to permit widthwise movement of said sleeve and said contact base portion in said receptacle contact housing during said interconnection.

3. The connector assembly in accordance with claim 2 and including spring clip means disposed on said receptacle fiber optic line adjacent said contact base portion and in said receptacle contact housing, said spring clip means being configured to permit pivotal movement of said contact base portion and said sleeve within said receptacle contact housing during said interconnection.

4. The connector assembly in accordance with claim 1 wherein said plug fiber optic line has a portion thereof configured as a series of compressible washers, said washers portion being adapted to permit axial movement of said plug fiber optic contact upon said engagement with said receptacle fiber optic contact.

5. The connector assembly in accordance with claim 1 wherein said sleeve is split substantially along its length to render said sleeve expandable and adapt said sleeve to self-adjust to receive said plug fiber optic contact during said interconnection.

6. The connector assembly in accordance with claim 1 wherein a distal end of said plug fiber optic contact is rounded to facilitate engagement with said split sleeve.

7. The connector assembly in accordance with claim 6 wherein a distal end of said plug fiber optic contact is rounded to facilitate engagement with said split sleeve.

8. The connector assembly in accordance with claim 1 wherein said plug connector housing has therein an enlarged portion of a central bore, said plug fiber optic contact extending into said central bore enlarged portion, and a band of electrically conductive material disposed in said bore enlarged portion and around said plug fiber optic contact, said band being adapted to engage said receptacle contact housing for electrical connection therebetween upon said interconnection.

9. The connector assembly in accordance with claim 8 wherein said band is bowed radially inwardly at a central lengthwise portion thereof, said bowed portion being adapted to receive said receptacle contact housing, said bowed portion being operative to guide said receptacle contact housing centrally thereof to center said receptacle contact housing concentrically within said plug contact housing during said interconnection.

10. The connector assembly in accordance with claim 9 wherein said bowed portion of said band is louvered and said louvers are adapted to engage said receptacle contact housing.

11. An electro-optical connector assembly, comprising a receptacle assembly and a plug assembly, said receptacle assembly and said plug assembly being adapted for face-to-face interconnection with each other, said receptacle assembly comprising receptacle housing means having a first bore therethrough, a receptacle fiber optic line extending from outside rearwardly said receptacle housing, through said first bore, and having a receptacle fiber optic contact extending forwardly from a face portion of said receptacle assembly, and an electrically conductive receptacle contact housing disposed substantially concentrically around said first fiber optic line, an electrically conductive first wire joined to said receptacle contact housing and extending outwardly and rearwardly of said receptacle housing, said receptacle housing being adapted for disposition in a bulkhead of an underwater chamber with said face portion of said receptacle assembly adapted for disposition on the seaward side of said bulkhead and a rearward portion of said receptacle housing means being adapted for disposition in said chamber, said plug assembly comprising plug housing means having therein a plug fiber optic line having as a portion thereof a plug fiber optic contact, and an electrically conductive plug contact housing adapted for sliding connection, respectively, to said receptacle fiber optic contact and said receptacle electrically conductive contact housing, said receptacle fiber optic line having on a portion thereof an enlarged collar portion, and a retainer member disposed in said receptacle contact housing and around said receptacle fiber optic line, said retainer member comprising a rigid sleeve portion with a first end abutting said first cable enlarged collar portion and a second end having an outwardly extending flange portion, said flange portion being anchored in said receptacle housing and abutting a rearward end of said receptacle contact housing, whereby pressure exerted from said seaward side against said face portion of said receptacle assembly, urging said first fiber optic line rearwardly of said receptacle assembly is resisted by said retainer member.

12. The connector assembly in accordance with claim 11 in which said retainer member flange portion is fixed to said receptacle contact housing rearward end.

* * * * *